ID
3,632,679
COMPOSITE POLYMERIC MATERIALS
Elmer J. De Witt, Cuyahoga Falls, and Eugene J. Sehm, Akron, Ohio, assignors to The B. F. Goodrich Company, New York, N.Y.
No Drawing. Filed Oct. 5, 1967, Ser. No. 672,982
Int. Cl. C08f 15/00
U.S. Cl. 260—878 R     5 Claims

ABSTRACT OF THE DISCLOSURE

Composite, macro-granular polymeric materials are disclosed in which the individual particles consist of a continuous matrix of a vinyl chloride resin in which is uniformly dispersed latex-derived particles of a rubbery, essentially completely gelled polymer of an alkyl acrylate. Such materials are prepared by polymerization in aqueous suspension of a monomeric material containing vinyl chloride starting in the presence of a slurry of crumbs or a latex of the acrylate polymer yielding directly an aqueous slurry of the granular product. The products are useful as rigid structural resins and also as impact-improvers and processing aids in rigid blends with other vinyl chloride resins and after-chlorinated polyvinyl chlorides.

CROSS REFERENCES TO RELATED APPLICATIONS

The use of the improved polymeric materials of this invention in high-impact blends with vinyl chloride resins is the subject of the co-pending sole application of Eugene J. Sehm, Ser. No. 673,055, of even date. Blends of the improved additives of this invention with chlorinated polyvinyl chloride are the subject of a co-pending sole application of Eugene J. Sehm, Ser. No. 672,963 filed Oct. 5, 1967 now U.S. Pat. No. 3, 488,406.

BACKGROUND OF THE INVENTION

This invention relates to improved composite polymeric products useful as rigid resins and as processing aids and impact-improving additives in the formulation of rigid and semi-rigid forms of vinyl chloride resins and of post-chlorinated vinyl chloride resins and to a method of making same.

Heretofore, the processing of rigid and semi-rigid forms of polyvinyl chloride and/or post-chlorinated polyvinyl chloride have employed one or more polymeric additives as an aid to processing and/or to improve impact resistance. Usually, the processing aid is a hard, resinous material having better flow properties under shear than those of the vinyl chloride resin or the post-chlorinated polyvinyl chloride. For improvement of impact resistance, the additive usually is a rubbery material such as many of the synthetic rubbers. In some cases, the hard, resinous additive is over-polymerized on the rubbery material to form a composite additive. Whether present alone or in a composite additive, most known resinous processing aids usually decrease the resistance of the final blend to distortion by heat, increase breakdown during mixing and impair the resistance of the blend to chemicals, solvents and the environment. Most known rubbery additives are expensive and are more or less critical (i.e. narrow processing latitude) as to their proportion and manner of incorporation; are not sufficiently stable during long term service of the blend; and, apparently, due to their more or less unsaturated structure, break down unpredictably during high speed, high temperature mixing and processing, especially if the latter is continued for more than a short time. Better and more efficient additives are needed to reduce the cost, improve reliability, extend the usefulness and field of application, and generally improve rigid and semi-rigid forms of vinyl chloride resins and of post-chlorinated polyvinyl chloride.

PRIOR ART

As indicated, composite polymeric additives for similar uses have been known heretofore. For example, in U.S. Pats. 2,802,809 and 3,167,598 hard, resinous styrene/acrylonitrile copolymers are shown to have been over-polymerized on a rubbery butadiene polymer to produce a composite material useful as processing aid and impact-improved in polyvinyl chloride. Similarly, in U.S. Pat. 2,943,074 polymethyl methacrylate is shown to have been over-polymerized on a rubbery butadiene/styrene copolymer; in U.S. Pat. 3,264,373 polymethyl methacrylate is over-polymerized on a butadiene/alkyl acrylate copolymer; and in U.S. Pat. 3,251,904 a rubbery polymer of an alkyl acrylate is shown to have been provided with a polymethyl methacrylate over-coating.

SUMMARY OF THE INVENTION

In accordance with this invention, it has been discovered that composite, macro-granular polymeric materials in which the individual granules are made up of a continuous matrix of a thermoplastic vinyl chloride resin, as defined below, in which are uniformly dispersed small particles of a tough, rubbery polymer of an alkyl acrylate, also as defined below. The disperse phase is made up of individual rubbery particles of tough but rubbery acrylate polymer of a size in the range of that of latex particles, namely, from about 500 to about 8000 Angstrom units (A.), more preferably from about 1500 to about 8000 A., and most preferably from about 2000 to 4000 A., in average diameter and comprising a tough, rubbery, essentially completely gelled or insoluble polymer of an alkyl acrylate. Such composite materials per se exhibit extremely high resistance to impact and, when employed as an additive in blends with a vinyl chloride resin, impart not only high resistance to impact to the blend but also wide processing latitude, all without substantial reduction in the intrinsic heat distortion characteristics of the particular vinyl chloride resin employed. The gelled condition of the acrylate polymer makes for most reliable developement of high impact resistance and makes the vinyl chloride resin formulation containing it retain its high impact resistance quite tenaciously during high temperature processing. The small size of the rubbery disperse particles appears to make the additive more efficient as an impact-improver (i.e. less may be required for good impact resistance) and may also be partially responsible for the minimal effect on the heat distortion characteristics of the blend. The normally soft, tacky surface of the alkyl acrylate polymer is masked by the vinyl cholride resin matrix permitting great ease of handling and use of the product as an additive to other resins in powder blending techniques.

The state of association in the composite products of this invention is new and novel and is derived both from the toughness and physical and chemical integrity of the rubbery polyacrylate particles themselves and from the method by which the composite products are produced. Known products of this same general class often are described as "graft" copolymers or as having an over-polymerized coating of resinous materials on a rubbery "substrate." However, more soluble, rubbery ingredients are soluble in, or at least very highly swollen by, monomeric materials such that during the over-polymeriztion step the original physical integrity of the rubbery material can be drastically altered or destroyed. The tenacity with which the composite products of this invention retain high impact strength under high shear is believed due to the tough, gelled character and physical integrity of the small polyacrylate particles. This latter conclusion is supported by electron microscope photographs which show virtually unchanged size, shape and degree of dispersion of the polyacrylate particles in sheets milled at stock temperature around 400° F. as in the original granules. The toughness or impact strength of similar products prepared from more soluble rubbery additives does not reach as high a level and very quickly disappears during only slightly extended mixing cycles, for example, a blend of polyvinyl chloride with a well-known commercially-available impact-improver constituting a polymethyl methacrylate over-polymer on styrene/butadiene rubber has an Izod impact strength of about 13 ft. lbs./in after 5 minutes at 410° F. milling cycle and a value of only about 3 ft. lbs./in. or less after a milling cycle of 10 minutes at the same temperature. In contrast, similar values on a formulation employing a product of this invention will exhibit essentially constant or even increasing impact strength under the same test. Equally important is that products of this invention develop high impact strength when mixed over a wide range of 335 to 440° F. mixing temperatures developed in the newer, high speed processing machines and, for this reason, are said to have wide processing latitude. Known products, on the other hand, develop their best properties, if at all in this range only over a narrow portion of such a range and, as a result, have narrow processing latitude. This processing latitude is believed to be due to a lack of breakdown or smearing-out of the tough, gelled polyacrylate under high temperature shear.

By the term rubbery, as applied to the acrylate portion, is meant an elastomeric nature which is capable of being elongated by at least 100% and which when released will recover at least 75% of its original length.

By the term "essentially completely gelled," as applied to the acrylate material, is meant a material which per se exhibits a solubility in toluene at room temperature of less than 20%/wt. as determined by an ultra-centrifuge technique, more preferably less than about 10% wt. soluble in toluene, and most preferably less than about 5%/wt. The composite resinous materials of this invention will usually exhibit a higher solubility than that of the polyacrylate material alone due to the solubility of at least a portion of the vinyl chloride resin matrix material. In some cases herein, the solubility of the acrylate component may be expressed in terms of its solubility in tetrahydrofurane (THF). It should be understood that a given acrylate material usually exhibits a somewhat higher solubility in toluene than in THF.

ACRYLATE POLYMERIZATION

The polyacrylate component is produced by the polymerization of a monomeric material free of conjugated unsaturation and containing (1) at least 80%/wt. of one or more monomeric alkyl acrylates in which the alkyl group contains from 2 to 4 carbon atoms, (2) up to about 19.5%/wt. of one or more monovinylidene monomers (i.e. a monomer containing a single vinylidene (CH$_2$=C<) group per molecule) copolymerizable with the alkyl acrylate, and (3) from about 0.5 to about 8%/wt., more preferably from about 1 to about 4% wt., of a gel-inducing commonomer which is free of conjugated unsaturation, which is copolymerizable with the alkyl acrylate, and which is selected from the class consisting of (1) the monomeric acrylic polyesters of polyhydric alcohols and of an acrylic acid selected from the class consisting of acrylic acid and methacrylic acid, which polyesters contain from 2 to 6 acrylic ester groups per molecule, and (2) the polyalkenyl polyesters of polyhydric alcohols containing from 2 to 6 alkenyl ether groups per molecule and in which the alkenyl ether groups are each present in the structure CH$_2$=C<.

Thus, the polyacrylate component is prepared from one or more of ethyl acrylate, propyl acrylate, n-butyl acrylate, isobutyl acrylate and others. The most preferred polyacrylate is prepared from n-butyl acrylate. Polymers of methyl acrylate are not sufficiently rubbery. Polymers of the alkyl acrylates higher than butyl acrylate lack toughness, and the higher members also lack rubberiness.

In addition, there may be employed (though not preferred) small amounts (i.e. up to 19.5% by weight) of other monovinylidene monomers such as vinyl acetate, vinyl chloride, vinylidene chloride, acrylonitrile, methyl methacrylate, styrene, alkyl acrylates in which the alkyl group is methyl or contains more than 4 carbon atoms such as 2-ethylhexyl acrylate, vinyl ethyl ether, vinyl ethyl ketone, acrylamide, 1-monoolefins such as ethylene, propylene, n-butene, 2-ethyl hexene-1, and others.

Suitable gel-inducing monomers of the above-defined class include the acrylic polyesters of polyalkylene glycols such as diethylene glycol diacrylate (abbreviated hereinafter as "DEGDA"), diethylene glycol dimethacrylate, trimethylene glycol diacrylate, butylene glycol diacrylate, pentamethylene glycol diacrylate, glyceryl diacrylate, glyceryl triacrylate, octylene glycol diacrylate, trimethylol propane triacrylate (hereinafter abbreviated as "TMPTA"), triamethylol propane trimethacrylate, the tetraacrylate ester of pentaerythritol, and others, and the poly alkenyl polyethers in which the double bonds of the alkenyl ether groups are present in the terminal vinylidene CH$_2$=C< group such as are produced by the Williamson synthesis in which a suitable alkenyl halide such as allyl bromide is reacted with an alkaline solution of a polyhydric alcohols derived from sugar and related carbohydrates such as sucrose, maltose, fructose, and the like, an illustrative monomer of this latter type being a polyallyl ether of sucrose containing 2, 3, 4 or more allyl ether groups per molecule, and many others.

Most preferred as gel-inducing comonomers are the acrylic polyesters of a polyalkylene glycol and acrylic or methacrylic acid containing from 2 to 6 acrylic ester groups per polyester molecule. These polyesters copolymerize quite smoothly with the alkyl acrylates and appear to enter the copolymer chain in a uniform, random manner and at a frequency apparently determined largely by their concentration in the monomeric mixture. They seem to form no tightly gelled or rigid three-dimensional networks which, if present, may not disperse in the blends with vinyl chloride resins and may show up as hard resinous lumps or discontinuities in the final blend. The glycol acrylate polyesters at levels of from 0.5 to 8% form copolymers with the C$_2$-C$_4$ alkyl acrylates which are essentially insoluble yet which are highly rubbery in nature. Such insoluble, rubbery copolymers most reliably impart extremely high resistance to impact to the composite product and to blends of the latter with vinyl chloride resins over a wider range of processing conditions. Such impact resistance is retained much more tenaciously than any previously known blend during long-extended processing of the blends, as for example, is involved where the blend is prepared in one processing step and then is reheated and reworked a second time during final processing by extrusion, calendering, injection molding or blow-molding or vacuum forming into final shaped articles.

Optimum levels of the gel-inducing comonomers, as determined by the impact resistance of blends of products of this invention with vinyl chloride resins, lie in the range of from about 1% to about 5%/wt. and most preferably in the range of from about 1% to about 4%/wt.

The monomeric materials just described are polymerized in aqueous emulsion or dispersion to form the rubbery acrylate by any of the known techniques which favor the formation of aqueous dispersions or latices of the polyacrylate. In the latter method, control of the emulsifier and catalyst at low revels in a known manner during the early portion of the polymerization plus a controlled continuous or portionwise addition of these ingredients during the course of the reaction will suppress new particle initiation and restrict latex particle size distribution. Thus, the polymerization is encouraged to form larger particles and a narrower particle size distribution in which the average particle size is in the range desired. Such polymerization procedures utilize oil- and/or water-soluble peroxygen-type and redox-type catalysts including potassium persulfate, persulfate/sulfite redox combinations, azoisobutyronitrile, 2,4-dichlorobenzoyl peroxide, caprylyl peroxide, and many others. Buffers, chelating agents, reducing agents, dispersing or emulsifying agents and other polymerization adjuvants other than molecular weight modifiers may be employed where desired.

The use of mercaptans or other types of molecular weight controllers and gel-inhibitors should not be employed in producing the gelled polyacrylate component of this invention since the action of these substances might reduce the toughness of the polyacrylate and introduce color and/or odor problems not tolerable in many rigid resin applications.

Synthetic dispersants such as dodecyl benzene sodium sulfonate, sodium lauryl sulfate, and others are preferred. Likewise, a fine particle size polyacrylate latex may be employed as a seed latex to assist in achieving larger latex particles in the range of 500 to 8000 A., more preferably from about 1500 to about 8000 A. and most preferably from 2000 to about 4000 A. Such polymerizations can be carried out at any ordinary temperature in the range of 0° to 100° C., more preferably from about 20° to 90° C., and most preferably from about 25 to about 70° C. In many cases, it may be desirable to strip most of the unreacted monomers, if any, from the resulting latex in order to avoid extraneous copolymer formation during the subsequent polymerization of the vinyl chloride monomer.

VINYL CHLORIDE RESIN MATRIX

The hard, resinous matrix portion of the composite products of this invention is produced by polymerizing a monomeric material containing at least 80%/wt. of vinyl chloride, more preferably at least 90%/wt., of vinyl chloride in an aqueous medium containing the small particles (of the size specified) of the polyacrylate component. The small particles of polyacrylate can be present in such medium either as a true aqueous latex containing the small particles (of the size specified) of the polyacrylate component. The small particles of polyacrylate can be present in such medium either as a true aqueous dispersion or latex or they can be present as crumbs produced by coagulation, spray drying or freeze coagulation of a polyacrylate latex. While the vinyl chloride polymerization medium may contain emulsifiers and dispersants so as to produce a latex of composite product, such is not preferred. Rather, it is preferred to carry out the vinyl chloride polymerization in an aqueous suspension system, i.e. an aqueous system containing (1) an oil-soluble or vinyl chloride soluble catalyst, (2) little or no added emulsifiers, (3) a suspension-stabilizing colloid such as gelation, polyvinyl alcohol, methyl cellulose bentoinite clay, and the like and (4) if desired, added water. When one initiates such a polymerization starting with a polyacrylate latex, polymerization proceeds with the gradual disappearance of the latex phase and the production of a slurry of macro-granular particles (i.e. from about 50 to about 600 microns in diameter) of composite product in which the very small polyacrylate particles are very uniformly dispersed in the matrix of vinyl chloride resin. Likewise, the suspension style of polymerization may be commenced in the presence of a slurry of crumbs produced by the coagulation of a polyacrylate latex. In the latter case, polymerization of the vinyl chloride containing monomer proceeds throughout the body of each crumb producing, surprisingly, a composite product in which the vinyl chloride resin is the continuous phase of matrix in which the individual polyacrylate latex particles are uniformly dispersed. The crumb slurry modification may have the advantage of lower reaction viscosities and possibly higher operating solids levels. The latter result may be explained on the basis that the crumbs are merely loose, physical aggregates of latex particles which structure may break down or disassociate to some extent during the polymerization cycle due to agitation in the presence of water, monomer and protective colloid.

The all-latex system producing a latex of composite polymeric product is less desirable because of the necessity to coagulate, spray dry, freeze agglomerate or otherwise precipitate the solids content of the final latex in order to obtain a solid product. Also, the resulting product is apt to be more or less contaminated with electrolytic residues from the emulsifiers, buffers, and water-soluble catalysts usually employed and this leads to lowered final product stability. The preferred suspension procedure produces a purer, more stable product.

In addition to the vinyl chloride, the vinyl chloride containing monomer may contain up to about 20%/wt. of one or more other mono-vinylidene monomers (i.e. a monomer containing a single $CH_2=C<$ group per molecule), more preferably not more than about 10%/wt. of such monomers. Such other monomers include 1-olefins such as ethylene, propylene, 1-butene, 1-hexene, 2-ethylhexene-1 and others styrene, acrylonitrile, alkyl acrylates such as methyl acrylate, ethyl acrylate, etc., acrylamide, vinyl acetate, vinylidene chloride, and many others.

Strongly preferred are monomeric materials selected from the class consisting of vinyl chloride alone and mixtures consisting of vinyl chloride and from about 1% to about 15%/wt. of propylene. The vinyl chloride/propylene copolymers made from such mixtures contain from about 93% to about 99.5%/wt. of combined vinyl chloride and from about 0.5 to about 7%/wt. of combined propylene. Such copolymers have inherent stabilities similar to that of polyvinyl chloride and have a special advantage of contributing better flow behavior than polyvinyl chloride to the composite product and to blends of the latter with other vinyl chloride resins.

As indicated, the preferred suspension system employs an oil-soluble catalyst (i.e. oil-soluble in contradistinction to water-soluble types such as potassium persulfate) such as any of the diacyl peroxide, aryl peroxides, hydroperoxides, ketone peroxides, percarbonates, peroxyesters, azo types and the like including caprylyl peroxide, benzoyl peroxide, isobutyryl peroxide, diisopropyl peroxy dicarbonate, azoisobutyronitrile, and others.

The polymerization of the vinyl chloride containing monomeric material can be carried out at any temperature in the range of from about 20° C. to about 90° C. most preferably in the range of from about 25° C. to about 65° C. Since the products are to be utilized in rigid or semi-rigid formulations, the matrix material should have the moderate to high molecular weight shown by inherent viscosities (measured using 0.2 gram of resin in 100 ml. of cyclohexanone at 30° C. by ASTM D 1243) of at least about 0.40 and up to about 1.45, with the range of from about 0.55 to about 1.2 being preferred.

Surprisingly, the suspension polymerization proceeds without inhibition or uncontrolled deposition of polymer with the gradual disappearance of the polyacrylate latex or crumb phase and the formation of a slurry or quick-settling suspension of composite particles of exceptionally uniform size and shape. Such a product requires only to be filtered, washed with water and dried to form a final product of this invention. This type of product made starting with a polyacrylate latex has novel, free-flowing characteristics exceptionally well adapted to powder blending and handling techniques. Screen analysis of these products shows them to be low in dust-sized particles with a great preponderance (i.e. about 95%/wt.) of the particles being in the range from about 150 to about 600 microns in diameter.

COMPOSITION

The proportion of the polyacrylate component can be as low as about 2 to 5%/wt. based on the total weight of both polymers (i.e. 95 to 98% of vinyl chloride resin)

since the latter proportions are about the minimum for a detachable improvement in impact resistance (i.e. an Izod increase of at least about 0.5 ft. lb./in. of notch) and in processibility. Generally, further improvement in impact resistance is small or not significant above about 20%/wt. of polyacrylate and other properties such as heat distortion and chemical and solvent resistance may be impaired. For these reasons, a range of from about 5 to about 20%/wt. of polyacrylate is more preferred. Most preferred is the range from about 5 to about 15%/wt.

The composition of blends containing a product of this invention will sometimes be referred to herein in terms of "PHR" which is an abbreviation for "parts (by weight) of polyacrylate per hundred (parts/wt.) of (total) resin or polymer."

OTHER INGREDIENTS

If desired, other ingredients may be added to the composite polymeric product before, during and after final work-up. For example, a dispersion or solution of one or more polymerization shortstops, antioxidants and/or stabilizers can be added to the suspension and the polymer worked up so as to obtain an already stabilized product. Colorants, fillers, pigments, opacifiers, lubricants and other convention compounding materials may be added in this fashion or dry-mixed with the dry product before its use in a final resin formulation.

The composite products of this invention, and particularly those containing 10 to 20%/wt. of the gelled polyacrylate, can be blended with vinyl chloride resin (as defined) to produce final blends containing from about 4% to about 10%/ wt. of polyacrylate.. Such dilution blends often have somewhat improved properties compared to the undiluted composite product alone. Also, one can effect some modification of blend properties by suitable choice of the blending resin for example, a vinyl chloride resin of molecular weight higher than that of the matrix resin to improve physical properties or a vinyl chloride resin of improved processability to produce more easily-processed blend.

While the products of this invention are shown in the examples below as being employed in making blends by mill-mixing, it is to be understood that such products are well adapted to being used as rigid resins alone.

In order to most easily demonstrate the great utility of the products of this invention in most of the examples to follow, the product of this invention is mixed with another resin and then the physical and chemical characteristics of the resulting blend are evaluated. In the examples below the products of this invention are admixed with polyvinyl chloride, with vinyl chloride/propylene copolymer resins, or with chlorinated polyvinyl chloride resins in rigid-type, high-impact type of formulations. The blends are prepared by milling on a closely-spaced two-roll plastic mill the rolls of which are temperature-controlled at the indicated milling temperature. The procedure is first to add the vinyl chloride base resin to the rolls along with all other compounding ingredients and mix until the material forms a smooth band adhering to one of the rolls. The composite additive of this invention is then added to the material on the rolls and the mixing continued until a smooth band again forms adhering to one roll. Time of milling is measured from the latter time with the stock being cut back and forth to insure efficient mixing and the expenditure of considerable mechanical shear on the stock. Such mixing appears essential to develop optimum impact resistance in the final blend. The mixing is carried out over the range of roll temperatures from about 300° to about 440° F., with from about 325° to about 420° F., being preferred. Stock temperatures will usually be somewhat above the roll temperature due to frictional heat build-up. When the mixing is adjudged complete, the material is sheeted off and cooled then preheated for five minutes to a temperature 10° F. above its milling temperature before being press molded for 3 minutes under 30,000 lbs. in a standard tensile sheet mold at the preheat temperature. ASTM Izod impact resistance expressed as ft. lbs./in. of notch are determined on the resulting sheets according to ASTM Procedure No. D 256–56, Method A. In some cases, the ASTM Heat Distortion Temperature (HDT) is also determined on the press molded sheet employing ASTM Procedure No. 648–56 at 264 p.s.i.

In some of the examples below, the melt flow properties of the over-polymerized product and its blends with vinyl chloride base resins are evaluated. In this "Melt Flow" test a given-sized sample of the resinous material (4 grams, usually) is confined in a cylinder under a piston exerting a pressure of about 2000 p.s.i. at 180° C. and is forced thereby to flow through an orifice of 0.045 inch diameter $(L/D=7)$. The time for a given weight of extrudate is recorded and this is given as the melt flow value.

It is to be understood that the term "rigid resin" as applied to the products of this invention mean a product having a heat distortion temperature above room temperature (i.e. above about 25° C.) and preferably above about 50° C. Rigid vinyl chloride resin formulations usually have tensile strengths above about 4500 to 5000 lbs./sq. in. whereas semirigid and flexible formulations have tensile strengths below this level. Flexible formulations ordinarily are not thought of in terms of their impact strength since their ready extensibility and flexibility make it difficult or impossible to run an Izod type test on them.

EXAMPLE I

In this example several latices of gelled polybutyl acrylates are employed in the production of a product wherein polyvinyl chloride is the matrix material.

Preparation of latex of gelled polybutyl acrylate

A large batch of latex is prepared using the following materials:

| Material: | | Parts/vol. Parts/wt. |
|---|---|---|
| Water | ml__ | 2100 |
| $K_2S_2O_8$ | gram__ | 1 |
| $K_2S_2O_5$ (5% aq. sol.) | ml__ | 10 |
| $Na_2S_2O_4$ (1% aq. sol.) | ml__ | 2 |
| n-Butyl acrylate | grams__ | 1250 |
| DEGDA [1] | grams__ | 38.5 |
| Emulsifier solution [2] | ml__ | 55 |

[1] Diethylene glycol diacrylate.
[2] Trademark "Siponate DS10" (10%/wt. Sk. Sol.), an emulsifier made by Alcolac Chemical Corporation and said to be a purified form of dodecyl benzene sodium sulfonate.

The water and $K_2S_2O_8$ are combined in a closed, stirrer-equipped reaction vessel in which the oxygen has been displaced by nitrogen and the vessel and its contents heated to about 40° C. at which point the $K_2S_2O_5$ is added. The n-butyl acrylate and the diethylene glycol diacrylate are premixed and addition thereof in a portionwise manner begun at a rate to maintain the temperature in the range of 38°–40° C. while cooling with air only. In about forty minutes, after some 60 ml. of mixed monomer had been added, a 1 ml. portion of the 1% $N_2S_2O_4$ solution is added. At the same time, a 1 ml. portion of the emulsifier solution is added. Polymerization is continued in this fashion over a 7½ hour reaction period accompanied by repetitive portionwise addition of the monomer and of a 1 ml. portion of the emulsifier solution for about every 20 ml. of monomers added.

A stable latex results which is stirred for about a half hour at 35–40° C. after all materials have been added and then allowing the vessel and its contents to cool slowly to room temperature. The latex is then stripped of its unreacted monomers by vacuum distillation. There is obtained a yield of 3,223 grams of a stable latex containing 36.1% wt. of total solids, a pH of 5.3 and an average particle size of 2115 A., as determined by a soap titration technique.

A small sample of this latex is coagulated with methanol and the resulting rubbery crumbs dried in a vacuum oven at 50° C. The resulting dried product is a rubbery solid having considerable elasticity (at least 100–200% elongation) which recovers quite completely after stretching below the yield point. The dried rubbery material is placed in a sealed container with toluene and the container and its contents rolled on paint mixing rolls overnight at room temperature. The next day, the contents of the container are ultra-centrifuged at 30,000 r.p.m. to obtain a solid-free liquid. Total dissolved solids content of an aliquot portion of the clear liquid is determined and the total solubility of the original dry rubber arrived at by back-calculation. The solubility thus arrived at for this gelled polybutyl acrylate is very low, being of the order of 1.3%/wt.

A portion of the latex just described is coagulated by pouring it into several volumes of methanol while agitating the mixture. There is obtained a slurry of small, rubbery crumbs. The crumbs are filtered and dried to produce a material containing some fairly large pieces of rubbery material. Nevertheless, this material is employed in a suspension type of polymerization medium along with a mixture of vinyl chloride and propylene. The polymerization employs the following materials.

| Material: | | Parts/wt. parts/vol. |
|---|---|---|
| Water | ml | 1000 |
| Methocel 65 HG (1% Aq. mucilage)[1] | ml | 100 |
| K$_3$PO$_4$ | gram | 0.1 |
| Emulsifier (10%)[2] | gram | 0.3 |
| Polybutyl acrylate crumbs | grams | 30 |
| Catalyst IPP (10% Sol. in methanol)[3] | ml | 2 |
| Vinyl chloride | grams | 252 |

[1] Methyl Cellulose.
[2] Same as Example II.
[3] Diisopropyl peroxy di-carbonate.

The polymerization is carried out in 18 hours at 50° C. with the formation of a suspension of polymer. A yield of granular product weighing 295 grams is obtained with approximately 49% of the total added monomer polymerized. The dried product contains 10.2% wt. of polybutyl acrylate. The extractible portion of the matrix exhibits an inherent viscosity of 0.618 at a concentration of 0.353 gram in 100 ml. of cyclohexanone at 30° C. During the polymerization it was noted that early in the reaction the discrete pieces of rubbery polyacrylate material appears to be somewhat swollen due to the action of the monomers. In the later stages of the reaction, the swollen character gradually disappears and the suspended polymer gradually changes to a granular character. Apparently, polymerization of the vinyl chloride mixture occurs throughout the crumb and the individual polyacrylate latex-sized particles contained in the crumb are embedded in the copolymer matrix resin in much the same manner as if the polymerization had been commenced with the polyacrylate fully dispersed in water as a latex. The data below shows that such products are efficient impact-improvers in a vinyl chloride propylene copolymer base resin. Another experiment is conducted in this same fashion producing a composite product containing 15% wt. of polyacrylate. All of these materials are employed in blends with various vinyl chloride/propylene copolymer base resins all prepared by mill mixing and molding at 350° F. by procedures similar to those of the preceding examples. In each case, the following basic formulation is employed.

| Material: | Parts/wt. |
|---|---|
| Total polymer | 100 |
| Thermolite 31[1] | 2 |
| Calcium stearate | 1 |
| Ti-Pure R–500[2] | 5 |

[1] Trademark, a tin stabilizer made by metal and thermite corporation.
[2] Same as Example I.

The data are as follows:

| Sample | Base copolymer resin | | | Acrylate content, percent wt. of additive | | Melt flow/ gm./10 min. | ASTM Izod impact, ft. lbs./in. | ASTM HDT, °C. | Remarks processing behavior |
|---|---|---|---|---|---|---|---|---|---|
| | Percent wt. combined propylene | (1) | Percent wt.[2] | In additive | In formulation | | | | |
| 745-1[3] | | | | 10.2 | 10 | 21 | 16 | 64 | Smooth, glossy, milled quickly. |
| 745-2 | 3.5 | 0.633 | 30 | 10.2 | 7 | 18.6-22 | 2.0 | 65 | Do. |
| 745-3 | | | | 15 | 15 | 1.9 | 21.0 | 64 | Fairly smooth. |
| 745-4 | 3.0 | 0.840 | 33 | 15 | 10 | 1.9 | 21.0 | 66 | Do. |
| 745-11[4] | 2.2 | 0.95 | 100 | 0 | None | 33 | 0.6 | 69 | |

[1] Dilute solution viscosity at a concentration of 0.4000 gram per 100 ml. cyclohexanone at 30° C.
[2] Out of a total of 100 parts/wt. of resins.
[3] Additive, per se.
[4] Base copolymer resin, per se.

It is apparent in the foregoing table that the formulation wherein the composite product is used 100% is an extremely tough, high-impact material of exceptionally good processing quality. Both the latter and all of the blends have very high impact strength and exhibit good finish.

EXAMPLE II

In this example, polyvinyl chloride is polymerized in the presence of a latex of a gelled polybutyl acrylate prepared from a mixture of 98 parts/wt. of n-butyl acrylate and 2 parts/wt. of DEGDA by the preferred latex/suspension technique and the resulting products evaluated in blends with polyvinyl chloride.

The gelled polybutyl acrylate latex contained 37.2% wt. of total solids, exhibited a particle size of about 2500 A., and contained a rubbery polybutyl acrylate having a very low solubility (1.8% wt. in THF). The initial charge employed in the suspension polymerization is as follows:

| Material: | | Parts/wt. parts/vol. |
|---|---|---|
| Water | ml | 1000 |
| Methocel H.G. 65 (1%)[1] | ml | 100 |
| Siponate DS10 (10%)[2] | ml | 0.3 |
| K$_3$PO$_4$ | gm | 0.1 |
| Latex (acrylate latex described above) | gms | 54 |
| Vinyl chloride | gms | 300 |
| n-Butane | ml | 5 |
| IPP catalyst (10% sol. in methanol) | ml | 3 |

[1] Methyl Cellulose, 1%/wt. mucilage.
[2] Sodium Lauryl Sulfate.

The materials are added in the order listed to a stirrer-equipped reaction vessel which had been purged with nitrogen. Reaction commences almost immediately and the temperature is controlled at 50° C. After three hours, an additional 100 grams of vinyl chloride monomer are added. Reaction continues for three hours and 46 minutes after which the reactor and its contents are cooled rapidly and the excess vinyl chloride is vented. The product in the reactor is in the form of a slurry of very uniform particles. Such slurry is filtered, washed first with water and then with methanol and the filter cake dried in a vacuum oven at 50° C. The dried product weighs 306 grams. Upon chlorine analysis, this product is found to contain 92.4%/wt. of polyvinyl chloride and 7.6%/wt. of polyacrylate.

The product of this example is blended with polyvinyl chloride and compounded as follows:

| | Sample No. | | | |
|---|---|---|---|---|
| | A* | B | C | D |
| Material, grams: | | | | |
| "Geon 103EP" [1] | X | 9.6 | 14.3 | 18.9 |
| Thermolite 31** | 2.25 | 2.25 | 2.25 | 2.25 |
| Calcium stearate | 1.5 | 1.5 | 1.5 | 1.5 |
| Processing aid** | 2.25 | 2.25 | 2.25 | 2.25 |
| TiPure 500** | 3.75 | 3.75 | 3.75 | 3.75 |
| Product of Ex. V | 80 | 70 | 65 | 60 |
| Parts polyacrylate/100 parts/wt. PVC | 8.2 | 7.2 | 6.6 | 6.1 |
| Izod Impact | 16.0 | 14.9 | 11.3 | 1.6 |
| HDT (° C.) | 68.0 | 66.5 | 68.5 | 69.0 |
| Melt flow G/10** | 2.5 | 2.8 | 3.6 | 3.5 |
| Appearance of extrudates | Smooth, glossy (all) | | | |
| Milling cycle | 2 minutes at 410° F. (all) | | | |

*Composite product above.
**Same as in previous example.
[1] Trademark of The B. F. Goodrich Company, a commercially-available polyvinyl chloride resin having a dilute solution viscosity of 0.94.

The above data shows the excellent properties of a product of this invention both when used as a base resin without addition of another vinyl chloride resin and when utilized with but minor dilution with such other vinyl chloride resin. The above data also demonstrate the very high efficiency of the gelled polybutyl acrylate/PVC composite product. Even as little as 6.1 parts/wt. of the polyacrylate component per 100 PHR of polyvinyl chloride imparts more than a 1 ft.lb./inch of notch increase in Izod impact strength. The heat distortion properties of these blends are excellent.

The Izod impact and HDT values of the foregoing examples indicate that the gelled polyacrylates in all cases is exceptionally well-dispersed in the blend. This indicates that the suspension-style of polymerization employing an oil-soluble catalyst and starting either with crumb-style cross-linked polyacrylate or with a latex thereof produces directly a product useful in rigid formulation. There is some evidence that the suspension process favors the formation of higher molecular weight over-polymerized vinyl chloride/propylene copolymers.

Processing behavior of the blends in these examples is exceptionally good. Milled sheets are smooth and glossy in appearance. Milling times are shorter than when the vinyl chloride/propylene copolymer or post-chlorinated polyvinyl chloride base resins are milled alone.

The composite products and blends of the examples are easily extruded as pipe, tubing and sheet; they can be injection molded; they can be below molded and vacuum formed into bottles and other containers; and they can be extruded as insulation on wire and cable.

We claim:
1. A composite resinous polymerization product comprising macro-granules produced by polymerization in aqueous suspension, which granules consist of a (1) matrix of a hard, thermoplastic vinyl chloride resin selected from the class consisting of polyvinyl chloride and copolymers of from about 93% to about 99%/wt. of combined vinyl chloride and from about 1 to about 7%/wt. of combined propylene and (2) particles from about 1500 to about 8000 A. in average diameter dispersed uniformly in said matrix and consisting of a tough, rubbery, essentially completely-gelled copolymer of a monomeric material consisting of (a) an alkyl acrylate in which the alkyl group contains from 2 to 4 carbon atoms and (b) from about 1% to about 4%/wt. of a monomeric acrylic polyester of a polyalkylene glycol and of acrylic acid containing from 2 to 6 acrylate ester groups per polyester molecule, which rubbery copolymer exhibits a solubility in toluene at room temperature below about 10%/wt. and constitutes from about 5 to about 20%/wt. of said composite product the resulting composite resinous polymerization product being a rigid material possessed of high resistance to impact.

2. A product as defined in claim 1 and further characterized in that said matrix is polyvinyl chloride.

3. A product as defined in claim 1 and further characterized in that said matrix is a said copolymer of vinyl chloride and propylene.

4. A product as defined in claim 1 and further characterized in that said alkyl acrylate is n-butyl acrylate and said matrix is polyvinyl chloride.

5. A product as defined in claim 1 and further characterized in that said alkyl acrylate in n-butyl acrylate and said matrix is a said copolymer of vinyl chloride and propylene.

References Cited
UNITED STATES PATENTS

| 3,222,423 | 12/1965 | Roebuck | 260—877 |
| 3,251,906 | 5/1966 | Bauer | 260—881 |
| 3,334,156 | 8/1967 | Calentine et al. | 260—884 |
| 3,432,576 | 3/1969 | Beer | 260—878 |

JOSEPH L. SCHOFER, Primary Examiner

S. M. LEVIN, Assistant Examiner

U.S. Cl. X.R.

260—50, 80.73, 80.75, 80.81, 85.5 HC, 86.1 E, 89.5 A, 879, 884, 885

UNITED STATES PATENT OFFICE
CERTIFICATE OF CORRECTION

PO-1050 (5/69)

Patent No. 3,632,679        Dated January 4, 1972

Inventor(s) Elmer J. De Witt and Eugene J. Sehm

It is certified that error appears in the above-identified patent and that said Letters Patent are hereby corrected as shown below:

Col. 2, line 43 correct spelling of "development"; line 53, correct spelling of "chloride"; line 66, correct spelling of "polymerization".

Col. 3, line 60 insert --/-- between "4%" and "wt."; line 61, correct spelling of "comonomer"; line 68 "polyesters" should read --polyethers--.

Col. 4, line 70, "revels" should read --levels--.

Col. 7, line 2, "detachable" should read --detectable--.

Col. 11, "Thermolite 31"; "Processing aid" and "TiPure 500" should all refer to footnote " * Composite product above"; line 48 "below" should read --blow--.

Signed and sealed this 4th day of July 1972.

(SEAL)
Attest:

EDWARD M. FLETCHER, JR.
Attesting Officer

ROBERT GOTTSCHALK
Commissioner of Patents